United States Patent
Bindzus et al.

(10) Patent No.: US 6,428,836 B1
(45) Date of Patent: Aug. 6, 2002

(54) STARCH PHOSPHATE ESTER COMPOSITION, PROCESS AND METHOD OF USE IN FOOD

(75) Inventors: Wolfgang Bindzus, Belle Meade; Paul A. Altieri, Belle Mead; James J. Kasica, Whitehouse Station; Peter T. Trzasko, Plainsboro, all of NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 143 days.

(21) Appl. No.: 09/633,832

(22) Filed: Aug. 7, 2000

(51) Int. Cl.[7] ............................. A23L 1/05; C08B 30/12
(52) U.S. Cl. .................... 426/578; 426/293; 426/303; 426/520; 426/661; 127/33; 127/70; 536/109
(58) Field of Search .................. 126/70, 33; 536/109; 426/578, 661, 520, 303, 293

(56) References Cited

U.S. PATENT DOCUMENTS

| | | |
|---|---|---|
| 2,852,393 A | 9/1958 | Kerr et al. |
| 2,865,762 A | 12/1958 | Neukom et al. |
| 2,865,763 A | 12/1958 | Ferrara et al. |
| 2,884,413 A | 4/1959 | Kerr |
| 2,961,440 A | 11/1960 | Kerr et al. |
| 3,108,004 A | 10/1963 | Klostermann |
| 3,284,443 A | 11/1966 | Hay et al. |
| 3,298,865 A | 1/1967 | Bode |
| 3,320,237 A | 5/1967 | Greidinger et al. |
| 3,329,673 A | 7/1967 | Greidinger et al. |
| 3,352,848 A | 11/1967 | Blumenthal et al. |
| 3,399,200 A | 8/1968 | Hay et al. |
| 3,553,195 A | 1/1971 | Jarowenko |
| 3,600,193 A | 8/1971 | Glabe et al. |
| 3,615,586 A | 10/1971 | Rohlfs et al. |
| 3,753,857 A | 8/1973 | Rogols et al. |
| 3,792,178 A | 2/1974 | Noznick et al. |
| 3,843,377 A | 10/1974 | Alexander |
| 4,076,846 A | 2/1978 | Nakatsuka et al. |
| 4,166,173 A | 8/1979 | Wurzburg et al. |
| 4,216,310 A | 8/1980 | Wurzburg et al. |
| 4,370,353 A | 1/1983 | Yagi et al. |
| 4,375,481 A | 3/1983 | Kuwabara et al. |
| 4,499,116 A | 2/1985 | Zwiercan et al. |

(List continued on next page.)

FOREIGN PATENT DOCUMENTS

| | | |
|---|---|---|
| JP | 62248470 | 10/1987 |
| JP | 7021616 | 1/1995 |
| JP | 08000190 | 10/1996 |
| JP | 01954505 | 6/1997 |
| SU | 484853 | 1/1975 |

OTHER PUBLICATIONS

Lim, S. and P.A. Seib: Preparation and pasting properties of wheat and corn starch phosphates. Cereal Chem. 70(1993), pp. 137–144.

Marusza, K., and P. Tomasik: Highly phosphorylated starches. Starch/Staerke 43.

Nierle, W.: Ueber den Einfluss der Herstellungsbedingungen auf die Eigenschaften phosphatmodifizierter Maisstaeken und deren anwendungen. (The influence of the manufacturing conditions on the properties of phosphated corn starches and their application) Staerke/Starch 21 (1969), pp. 13–18.

(List continued on next page.)

Primary Examiner—Nina Bhat
(74) Attorney, Agent, or Firm—Laurelee Duncan, Esq.

(57) ABSTRACT

The present invention is directed to a process of preparing starch phosphate monoesters, optionally in the presence of oligosaccharides, having improved reaction efficiency and reduced side reactions. The invention also includes the improved starch phosphate monoester products, characterized by high viscosity and low level of residual salts, their use in food and the enhanced food compositions prepared from them.

19 Claims, 1 Drawing Sheet

U.S. PATENT DOCUMENTS

| | | | |
|---|---|---|---|
| 4,566,910 | A | 1/1986 | Hubbart et al. |
| 4,608,265 | A | 8/1986 | Zwiercan et al. |
| 4,695,475 | A | 9/1987 | Zwiercan et al. |
| 4,937,091 | A | 6/1990 | Zallie et al. |
| 5,192,568 | A | 3/1993 | Yokoyama et al. |
| 5,196,215 | A | 3/1993 | Yokoyama et al. |
| 5,508,050 | A | 4/1996 | Miki et al. |
| 5,807,601 | A | 9/1998 | Carpenter et al. |
| 5,827,372 | A | 10/1998 | Sosulski et al. |
| 6,277,186 | B1 * | 8/2001 | Shi et al. ............... 106/205.72 |

OTHER PUBLICATIONS

Radley, J.A.: Starch Production Technology. Applied Science Publisher, London, 1976.

Rutenberg, M.W. and D. Solarek: Starch derivatives: Production and use. In: Starch Chemistry and Technology, $2^{nd}$ edition, Chapter X, eds.: Whistler, R.L. BeMiller, J.N. and E.F. Paschall, 1984, pp. 312–388.

Salay, E. and Ciacco, C.F.: Production and properties of starch phosphates produced by the extrusion process. Starch/Staerke 42 (1990) 1, pp. 15–17.

Solarek, D.: Phosphorylated starches and miscellaneous inorganic esters. In: Modified Starches. Properties and Uses. Chapter 7, ed: O.B. Wurzburg, CRC Press, Boca Raton, FL., 1986, pp. 97–112.

Tziboula, A. and Muir, D.D.: Effect of starches on the heat stability of milk. Int. J. Food Science and Technology 28 (1993), pp. 13–24.

Payne et .al., (Payne, C.A., Hunt, M.D. and P.A. Seib: "Effects of Native and Phosphate–Modified Starch on the Yield and Texture of Low–Fat, High Added–Water Beef Sausages", Proceedings of the $46^{th}$ Annual Reciprocal Meat Conference, Publ. By National Live Stock and Meat Board, 1993.

Ruf, F., Phosphaltomodifizierte Staerken bei der industriellen Herstellung von Lebensmittein. Emaehrungs–Umschau 27 (1980), 3–8.

Trimble, E., Modified Starches in Food, J. Consumer Studies and Home Economics 7 (1983), 247–260.

Bergthaller, W. and H. Stephan, Ueber den Einsatz von Phosphatstaerken zur Verbessenrung der Brotfrischhaltung, Brof. und den Einsatz von Phosphatstaerken zur Verbesserung der Brotfrischhaltung. Brot und Gebaeck (1970) 12 227–231.

Leelavathi, K. Rao, P., H. and S.R. Shurpalekar, Use of Starch Phosphate in Bread and Biscuits. J. Food Science Technology 18 (1981), 3–7.

Bergthaller, W.: Untersuchungen ueber die Herstellung von Phosphorsaeureestern der Staerke, 1. Mitteilung. Einfluss der Phosphatzugabe und der Hitzebehandlungszeit auf den Phosphatgehalt und das rheologische Verhalten, (Studies on the preparation of phosphoric acid esters of starch. Part I. Influence of addition of phosphate and time of heat treatment on phosphate content and rheological behavior). Staerke/Starch 23 (1971), pp. 73–79.

Hamilton, R.M. and E.F. Paschall: Production and uses of starch phosphates. In: Starch, Chemistry and Technology II, Industrial Aspects. Chapter XIV, eds: Whistler, R.L. and E.F. Paschall, 1967, pp. 351–368.

Lim, S.: Preparation and properties of a thick–boiling, phosphorylated wheat starch for food use, and location of phosphate esters on starch by P–NMR spectroscopy. Dissertation, Kansas State University, 1990.

* cited by examiner

STARCH PHOSPHATE ESTER COMPOSITION, PROCESS AND METHOD OF USE IN FOOD

BACKGROUND OF THE INVENTION

The present invention is directed to a process of preparing starch phosphate monoesters, optionally in the presence of oligosaccharides, having improved reaction efficiency and reduced side reactions. The invention also includes the improved starch phosphate monoester products, which are characterized by high viscosity and a low level of residual salt, their use in food and the enhanced food compositions prepared from them.

Starch phosphate monoesters are anionic derivatives that yield higher-viscosity, clearer, and more stable dispersions than unmodified starch. Solarek, D. B., *Phosphorylated Starches and Miscellaneous Inorganic Esters: Properties and Uses,* CRC Press, Boca Raton, 1986, page 103. Increasing the level of phosphate substitution on starch phosphate monoesters results in desirably lower gelatinization temperatures. Id. However, increased phosphorylation levels also often results in a product with higher levels of residual inorganic phosphate salt. It is known that the viscosity of the starch phosphate monoester products is sensitive to salt and pH conditions. Id.

Traditional methods of phosphorylating starch generally require the impregnation of the base starch with an alkali-metal phosphate followed by heating to effect the phosphorylation process. A common manufacturing procedure is exemplified by U.S. Pat. No. 4,166,173, which describes the treatment of a starch cake with a 2–30% by weight aqueous solution of an alkali metal tripolyphosphate salt. The treated starch cake is then dried to a moisture content of less than 20% and heated to effect phosphorylation. In general, moisture content prior to the heat treatment is limited broadly to less than 20% in order to keep water from interfering in the phosphorylation reaction. Heat treatment effecting the phosphorylation of the starch is most often carried out in convection or vacuum ovens and conventional dextrinizers.

Starch phosphate monoesters have also been produced via fluidized bed technology. U.S. Pat. No. 3,284,443, describes the phosphorylation of starch which is carried out in a fluidized bed reactor as a continuous and batch process at moisture contents of less than twenty percent, and high temperatures of between 149 to 232° C. The high temperature of this process combined with long reaction periods results in high level of bound phosphorus and thus good reaction efficiency. However, it is known that high temperature and long reaction periods induce significant starch hydrolysis resulting in products with low viscosity and low purity that are unsuitable for use in food due to off-color and undesirable taste.

U.S. Pat. No. 3,843,377 and WO 99/64467 also suggest the use of a fluidized bed reactor in order to heat treat blends of starch and urea under semi-dry conditions of less than 5% moisture at temperatures of between 100 to 175° C. for between 20 to 60 minutes. These processes result in a large amount of bound nitrogen as well as bound phosphorus on the starch. In addition, the process undesirably releases ammonia as a side product. As a result, these products are unsuitable for certain uses, such as food applications. The use of a fluidized state to achieve substantially anhydrous conditions, conditions in which the moisture content is kept to less than 1%, is unknown.

Known processes do not proceed with a high reaction efficiency at low temperatures and short reaction times, thus minimizing side reactions and residual inorganic salts. There remains a need for an efficient process which produces relatively pure and high viscosity starch phosphate monoesters with less residual inorganic phosphate salt. The improved products of such an efficient process should desirably demonstrate enhanced viscosity, color and good moisture retention properties which are useful in a variety of applications, particularly as food additives.

The use of starch phosphate monesters in food has been described for a variety of high moisture food systems such as gravies, salad dressings, puddings, sour cream, bakery creams and milk as well as intermediate and low moisture food products such as meat, imitation cheese, baked products and frozen foods. In most cases, starch phosphate monoesters are used as viscosifiers in order to provide texture and/or stability. Further, JP62248470, describes the use of a starch phosphate monoester to improve the elasticity, water retention and stickiness of meat pastes and fish products. In addition, U.S. Pat. Nos. 4,499,116, 4,608, 265, 4,695,475 and 4,937,091 describe the use of pregelatinized, pregelatinized and converted as well as pregelatinized and enzyme treated phosphorylated starch monoesters in imitation cheese. However, these products have inferior gelling and cohesion properties, and thus do not have a desirably firm texture and tend to mat.

There remains a need to provide improved starch phosphate monoesters for use as additives to impart a variety of desirable textures, flavor, color and moisture retention properties, particularly in food products containing protein and having low to intermediate moisture content.

The present invention is directed to a process of preparing starch phosphate monoesters with improved reaction efficiency and reduced side reactions. The process may be conducted optionally in the presence of oligosaccharides. The invention also includes the starch phosphate monoester products which are characterized by improved viscosity, color and moisture retention properties. The invention further relates to the use of the starch phosphate monesters to improve the texture, color and moisture retention in food, particularly protein containing food having a low to intermediate moisture content, as well as the food compositions prepared therefrom.

BRIEF DESCRIPTION OF THE DRAWINGS

The above and other features of the invention will be further described in the following detailed specification considered in conjunction with the accompanying drawings in which.

SUMMARY OF THE INVENTION

Figure 1:
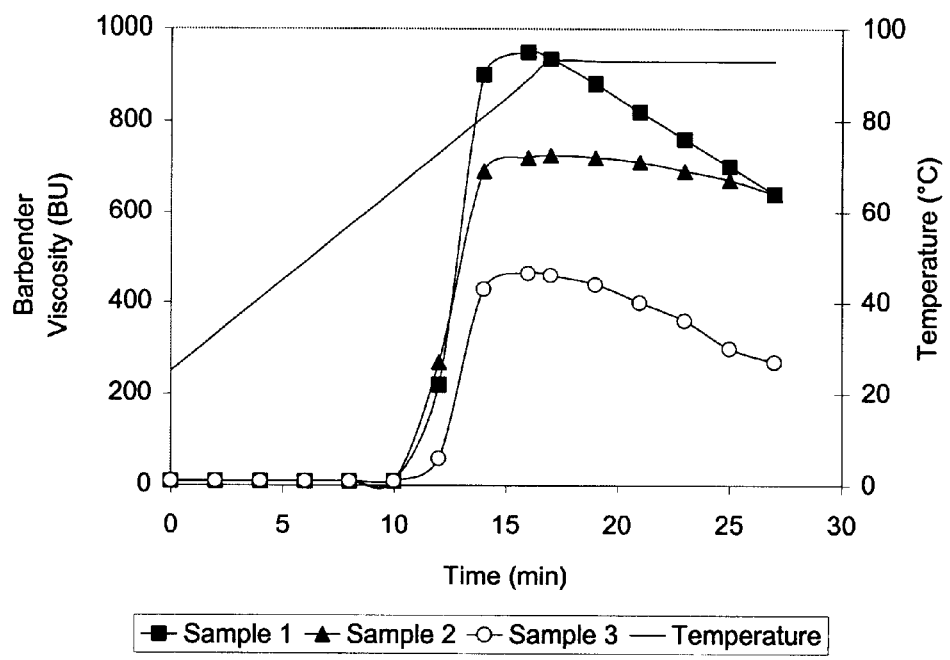
FIG. 1 compares the Brabender viscograms of waxy corn starch phosphorylated to the same degree by the present inventive process (taken at two different temperatures, Samples 1 and 2) and by a traditional method (Sample 3).

The present invention is directed to a process of preparing starch phosphate monoesters, optionally in the presence of oligosaccharides, having improved reaction efficiency and reduced side reactions. The invention also includes the improved starch phosphate monoester products, characterized by high viscosity and low level of residual salts, their use in food and the enhanced food compositions prepared from them.

The process of the invention comprises impregnating the desired starch with a phosphate reagent, and optionally, an oligosaccharide. While under fluidized conditions, the impregnated starch is then dried to virtually anhydrous conditions, and heated treated to effect phosphorylation. The virtually anhydrous phosphorylation provides improved reaction efficiencies of up to 85% or higher, and minimizes undesirable side reactions such as hydrolysis or crosslinking of the starch. The optional presence of oligosaccharides during phosphorylation results in products having higher viscosity.

The process may be adjusted to provide starch phosphate monoesters having varying degrees of viscosity, shear stability and color. These products also retain their granular integrity and exhibit improved moisture retention properties.

Food products treated with the improved starch phosphate monoesters generally result in products having lighter color and improved taste, texture and moisture retaining properties, particularly in protein containing foods having a low to intermediate moisture content.

DETAILED DESCRIPTION OF THE INVENTION

The present invention is directed to a process of preparing starch phosphate monoesters, optionally in the presence of oligosaccharides, having improved reaction efficiency and reduced side reactions. The invention also includes the improved starch phosphate monoester products, their use in food and the enhanced food compositions prepared from them.

All starches and flours (hereinafter "starch") may be suitable for use herein and may be derived from any native source. A native starch or flour as used herein, is one as it is found in nature. Also suitable are starches and flours derived from a plant obtained by standard breeding techniques including crossbreeding, translocation, inversion, transformation or any other method of gene or chromosome engineering to include variations thereof. In addition, starch or flours derived from a plant grown from artificial mutations and variations of the above generic composition which may be produced by known standard methods of mutation breeding are also suitable herein.

Typical sources for the starches and flours are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. A used herein, the term "waxy" is intended to include a starch or flour containing at least about 95% by weight amylopectin and the term "high amylose" is intended to include a starch or flour containing at least about 40% by weight amylose.

Conversion products derived from any of the starches, including fluidity or thin-boiling starches prepared by oxidation, enzyme conversion, acid hydrolysis, heat and or acid dextrinization, and or sheared products may also be useful herein.

Chemically modified starches may also be used, provided such modification does not destroy the granular nature of the starch. Such chemical modifications are intended to include without limitation crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Such modifications are known in the art, for example in Modified Starches: Properties and Uses, Ed. Wurzburg, CRC Press, Inc., Florida (1986).

The process of the invention comprises impregnating the desired starch with a phosphate reagent, and optionally, an oligosaccharide. While in a fluidized state, the impregnated starch is then dried to a virtually anhydrous state, preferably 1 percent by weight of the starch or less, and heated treated to effect phosphorylation. The impregnation of the starch by oligosaccharide and phosphate reagent may be done in any order. The pH of the resultant slurry may then adjusted to between about 3 and 12, preferably to between about 6 and 9.5.

"Phosphate reagent" as used herein is defined as any phosphate reagent used for phosphorylating starch including ortho-, pyro-, meta- or tripolyphosphates. Illustrative phosphate reagents are the alkali metal phosphates such as sodium and potassium ortho-phosphate, phosphoric acid, phosphorus oxychloride, sodium and potassium tripolyphosphate and sodium and potassium trimetaphosphate. The reagent may be either a mono-, di- or trialkyl metal phosphate or combinations thereof.

Impregnation by the phosphate reagent may be accomplished by adding the reagent in an amount of less than about 15% by weight of starch, preferably less than about 10%. The phosphate reagent may be added in the dry state to wet starch granules, or by dissolving the reagent in water to form an aqueous solution which is then mixed with the starch granules. These impregnation techniques are described in U.S. Pat. Nos. 4,166,173 and 4,216,310 which are incorporated herein by reference.

Any oligosaccharide may be suitable for use herein and may be derived from any native source such as those listed above. The source may be the same as or different from that of the starch component. As defined herein, oligosaccharide contains from one to twenty sugar units joined by glycosidic bonds. Oligosaccharide is intended to include monosaccharides, disaccharides, oligosaccharides, corn syrup solids, and maltodextrins. Oligosaccharide suitable for the present invention include, but are not limited to, debranched starches, corn syrup solids, dextrose, fructose, maltose, particularly corn syrup solids with a DE of from about 20 to 40. Although oligosaccharide is intended to include monosaccharides, these generally add color and/or flavor which may be undesirable in many industrial applications. Therefore, particularly suitable oligosaccharides for the present invention are those which contain at least two sugar units joined by glycosidic bonds.

Addition of the oligosaccharide to the starch may be achieved by adding the oligosaccharide dry or as an aqueous solution. In particular, the oligosacchrides may be added to an agitated starch slurry or starch may be added to a stirred, aqueous solution of oligosaccharide. In addition, an aqueous solution of the oligosaccharide may be sprayed onto dry or wet starch granules.

The impregnated starch, impregnated with phosphate and optionally with oligosaccharides, is then subjected to a fluidized state and heat treated to effect the phosphorylation. Though the heat treatment may be carried out in one step, it is preferably carried out in two steps. First, the impregnated starch is subjected to the fluidized state and dried to virtually anhydrous conditions, preferably less than about 1% moisture content by weight of starch, at less than about 140° C., preferably between 60° C. and 140° C., and most preferably between about 100 to about 125° C. Secondly, while still in the fluidized state, the dried product is heated to between about 100 to about 185° C., preferably between about 120 to about 140° C. for between about 30 to about 300 minutes. At temperatures higher than about 150° C., the processing time is preferably less than about 45 minutes.

The fluidized state is achieved by vigorous mixing of the solid starch particles in vacuum or in a gas whereby a uniform distribution of starch throughout the vacuum or gas may be attained. Vigorous mixing may be accomplished by using air or gas, at or above atmospheric pressures in a fluidized bed reactor or by sufficient mechanical agitation. Where pressurized gas is used to effect the fluidized state, the velocity of the gas must achieve a minimum rate such that the particles are free to move and exhibit a "fluidized state." The fluidized state results in very efficient heat transfer and allows the starch to rapidly dry to a virtually anhydrous state at low temperature.

The phosphate esters of the present invention are characterized by improved purity as the high reaction efficiency of the above described inventive process minimizes undesirable side reactions such as starch hydrolysis and crosslinking. The improved reaction efficiency also provides a product with a high level of substitution while providing a low level of residual inorganic phosphate salts in the final starch phosphate monoester products. Such products are characterized by improved viscosity, color and water retention properties. The new process also preserves the granular integrity of the starch advantageously allowing the optional washing of the final product. Such products desirably maintain a high viscosity, lighter color and improved moisture retention properties.

Reaction efficiency is defined to be the amount of bound phosphorus divided by the total amount of phosphorus used in the process, multiplied by one hundred. Reaction efficiencies of the present inventive process may reach up to or exceed 70 to 85%, much improved over the reaction efficiency of traditional methods of phosphorylating starches. As a particular illustration, Example 2 describes a waxy corn starch which is phosphorylated via traditional methods at 146° C. for 45 minutes in a continuous cooker and has a reaction efficiency of 18%. Phosphorylation of the same waxy corn starch at 149° C. for 60 minutes by the process of the present invention more than doubles the reaction efficiency obtained via the continuous cooker method and results in a value of 38%.

Residual salts refers to the residual inorganic phosphate salts remaining in the product starch phosphate monoester. Both residual salts and undesirable side products negatively impact the viscosity of the final product and the ability of the starch phosphate monoesters to act as effective food additives. The desirable effect of the anhydrous fluidized bed processing on the phosphorylation of the starches is illustrated in FIG. 1 below. FIG. 1 compares the Brabender viscograms of waxy corn starch phosphorylated to the same degree by traditional methods (described in U.S. Pat. No. 4,166,173) and the present inventive process (taken at two different temperatures). The improved starches of the present invention, labeled Samples 1 and 2 in FIG. 1, demonstrate desirable peak viscosities of well over 600 Brabender Units ("BU") as compared to only approximately 425 BU exhibited by the traditionally phosphorylated starch labeled Sample 3 in FIG. 1.

The starches of the present invention also exhibit improved structural integrity because hydrolysis is minimized during phosphorylation. It is known in the art that the effect of phosphate charge on the viscosity of starch may be negated by measuring viscosity in the presence of a high concentration of salt. See, for example, Muhrbeck, P., Eliasson, A. C., Influence of pH and Ionic Strength on the Viscoelastic Properties of Starch Gels—A Comparison of Potato and Cassava Starches, Carbohydrate Polymers 7 (1987), pg 291–300. Absolute viscosity is therefore defined to be the viscosity of the phosphorylated starches measured in the presence of sufficient salt so that charge no longer contributes to the viscosity of the final product. Such a measure of absolute viscosity may then be used to indirectly measure the relative structural integrity of the phosphorylated starches. Example 3 illustrates that the absolute viscosity relating to the structural integrity of the improved phosphorylated starches of the present invention is almost 40% higher than starches phosphorylated via a conventional process under less rigorous conditions.

Figure 2:
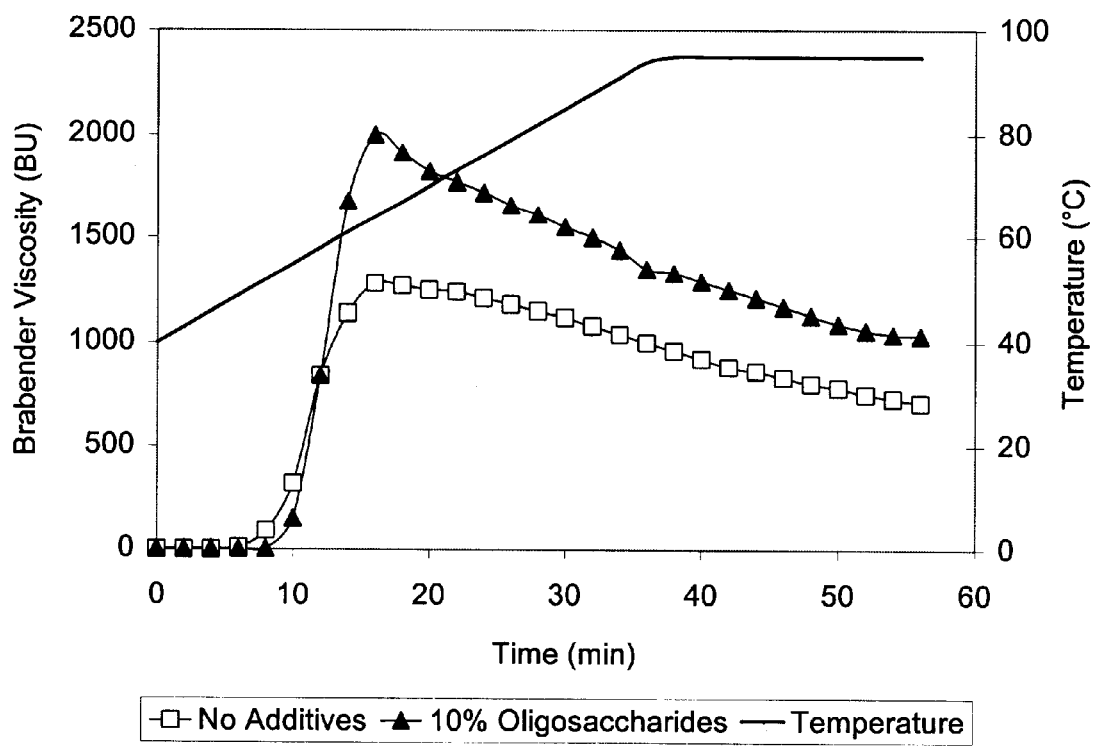
FIG. 2 presents the Brabender viscograms of a waxy corn starch phosphorylated via the present process wherein one sample is heated in the presence of 10% oligosaccharides and the other sample in the absence of oligosaccharides.

In the present inventive process, the addition of oligosaccharides to the impregnated starch results in a phosphorylated starch monoester with even greater viscosity. This improvement in viscosity is illustrated in FIG. 2, which presents the Brabender viscograms of waxy corn starch phosphate monoesters of the present invention. The process in which the starch was additionally impregnated with 10% oligosaccharides affords a product having a peak viscosity of over 2000 BU, whereas the same process conducted without oligosaccharides produces a product having a peak viscosity of about 1250 BU.

The improved starch phosphate ester products of the present inventive process may be used in any food or beverage product, preferably in protein containing foods with a low to intermediate moisture content. A low moisture content would include foods having less than 20% moisture by weight. Foods having intermediate moisture contents have a moisture content of between 20 to 50% by weight. Typical food products include, but are not limited to cultured dairy products such as acidic milk products, puddings, yogurts, cheeses, imitation cheese, and sour creams; sauces; gravies; pie fillings; salad dressings; baby foods; frozen foods; sausages, meat and meat analogs, fish and fish analogs; baked goods such as breads, crackers, cookies, cakes, muffins, rolls, pastries and other grain-based ingredients; pasta; beverages; fried and coated foods; and snacks.

In processed meat, such as injected turkey rolls, the use of the starch phosphate ester of the present invention results in commercially acceptable meat textures as well as improved purge and high yield. The processed meat of the present invention resemble and duplicate, in essential physical and taste characteristics, a wide variety of meat products. The present processed meat may resemble specific natural animal meat cuts such as bacon, steak, pork chops, etc., as well as natural meat systems that have been reprocessed and reformulated with other components as in a sausage product.

The texture of the meat product is evaluated by measuring the hardness and cohesiveness of the meat samples. Preferable textures duplicate the specific natural characteristics of fresh meat. Purge is defined as the percent loss in the weight of the product, typically as liquid, which has been vacuum packed over time. Commercially desirable products demonstrate a low purge value which is maintained over time. Yield is the percent difference in weight between the weight of the product after steam cooking and the original weight of the product. A high yield produces a more commercially desirably meat.

The meat products of the present invention are softer and less cohesive products, with textures desirably similar to fresh meat, compared to meat products made from industry standards such as native potato starch. The improved products also demonstrate improved purge and yield characteristics compared to products treated with native potato starch.

The starch phosphate monoester of the present invention may also be used in fish products, particularly surimi, to improve product texture. Fish that may be used in these products include, without limit, walleye pollack, atka mackerel, sardine, mackerels, pacific herring, saury, hairtail, pike eel, croaker, right-eye flounders, horse mackerel, Pacific hake, hoki, threatfin breams, alfonsino and the like. Surimi is a generic term for minced fish that has been processed to remove bones, fish oil and fish flavor. Surimi treated with the starch phosphate monesters of the present invention demonstrate significantly improved gel hardness and water retention resulting in superior textures as compared to surimi treated with native starches.

The starch phosphate monoester of the present invention may also be used in imitation cheese products to improve firmness, shred and resiliency. Imitation cheese products include very hard varieties such as parmesan and romano; hard varieties such as cheddar, mozzarella and provolone; semi-soft varieties such as blue cheese; soft varieties such as cream cheese; and pasteurized processed cheese such as American cheese, cheese foods and spreads and cheese products. These imitation cheese products provide the flavor and functionality of natural cheese at a reduced cost. The use of the starch phosphate esters in imitation cheese resulted in a firmer cheese analog with improved shred and resiliency (less matting) while desirably maintaining standard melt as compared to the properties of imitation cheese prepared with industry standard starches.

The following examples are presented to further illustrate and explain the present invention and should not be taken as limiting in any regard. All parts and percentages are given by weight and all temperatures in degrees Celcius (°C.) unless otherwise noted.

EXAMPLES

Example 1

This example Illustrates the superior viscosity of starch phosphate monoesters prepared via the new fluid bed process as compared to starch phosphate monoesters prepared via the traditional process.

Sample 1 was prepared by dissolving sodium tripolyphosphate (141 g) in water (4500 g). Then waxy corn starch (3000 g, dry weight) was added to the solution, stirred for about 10 minutes and filtered on a Buchner funnel. The resultant impregnated starch was then air dried to a moisture content of about 10% and ground using a Prater mill. Sample 2 was prepared by dissolving sodium tripolyphosphate (106 g) in water (4500 g), adding waxy corn starch (3000 g, dry weight), and stirring for about 10 minutes. The impregnated starch was then filtered on a Buchner funnel, air dried to a moisture content of about 10% and ground using a Prater mill.

Samples 1 and 2 were dried and phosphorylated in a fluid bed reactor. For both samples, the fluid bed reactor was pre-heated to 115° C. and the starch was loaded into the reactor. The temperature was maintained at 115° C. until the moisture of the impregnated starch was less than 1%. Afterwards, in order to effect the phosphorylation, the temperature of the reactor was increased to 127° C. for sample 1 and 149° C. for sample 2. For each sample, the temperature was maintained for 60 minutes. The heat treatment resulted in substantially similar levels of bound phosphorus for both samples: 0.20% for sample 1 and 0.19% for sample 2.

A waxy corn starch phosphate monoester was prepared via a traditional phosphorylation process (Sample 3) as follows. The impregnation of waxy corn starch with sodium tripolyphosphate was carried out (on a manufacturing scale) using the process described in U.S. Pat. No. 4,166,173. The moisture content of the impregnated starch was kept below 20%, as specified by the procedure. The subsequent heat treatment was carried out in a continuous cooker using a reaction temperature of 143° C. for 45 minutes. The heat treatment resulted in a level of bound phosphorus of 0.19%, substantially the same as Samples 1 and 2.

The viscosities of phosphorylated Samples 1, 2 and 3 were measured with a Brabender Visco-Amylograph on a sample prepared according to the following procedure. A starch slurry of a total weight of 460 g contained 5% (anhydrous weight) of starch and 50 g of a buffer solution (pH 3.0+/−0.05) made from citric acid monohydrate and tri-sodium citrate, dihydrate. The slurry was heated at a rate of 4° C./minute starting from 25° C. and increasing to 92° C. Once a temperature of 92° C. was reached, the temperature was held for 10 minutes. The Brabender viscosity profiles of Samples 1, 2, and 3 are presented in FIG. 1.

Although all three samples had similar levels of bound phosphorus (degree of substitution), the fluid bed processed waxy corn starch phosphate monoesters (Samples 1 and 2) developed significantly higher viscosity than the waxy corn starch phosphate monoester manufactured according to the traditional method (Sample 3). Thus, the starch phosphate monoesters of the present inventive process demonstrated improved viscosity characteristics independent of the level of bound phosphorus on the final product.

Example 2

This example illustrates the superior reaction efficiency of fluidizied bed processing over traditional methods of manufacturing starch phosphate monoesters.

Waxy corn starch was impregnated (on a manufacturing scale) with sodium tripolyphosphate (by weight of the starch) according to the procedure described in U.S. Pat. No. 4,166,173 resulting in an impregnated starch having 1.05% inorganic phosphorus by weight.

According to traditional process conditions, one sample of the impregnated starch was heat treated in a continuous cooker for about 45 minutes at a temperature of 146° C. (Sample A).

To illustrate the present inventive process, three samples of the impregnated starch were processed in a fluidized bed reactor. The reactor was pre-heated to 115° C., the starch was loaded into the reactor, and the temperature maintained at 115° C. until the moisture of the impregnated starch was less than 1%. In order to investigate the effect of temperature on the phosphorylation of the fluidized bed samples, the temperature of one sample was increased to 127° C. (Sample B), another sample to 138° C. (Sample C) and yet another sample to 149° C. (Sample D). These temperatures were maintained for each sample for 60 minutes.

The level of bound phosphorus and reaction efficiencies for each sample of starch phosphate monoester are presented in Table 1. Heat treatment in the continuous cooker via the traditional process resulted in a level of bound phosphorus of 0.19%. This corresponds to a reaction efficiency (RE= bound P/total P×100) of 18%. Phosphorylation in a fluid bed reactor at reaction temperatures ranging from 127 to 149° C. gave levels of bound phosphorus ranging from 0.25 to 0.40% (RE: 23 to 38%). As shown below, for Samples B to D, an increase in reaction temperature increased the level of bound phosphorus on the final product, resulting increases in the reaction efficiency.

A comparison of products of the fluid bed process and traditional process shows that a) the heat treatment of the starch in the fluid bed reactor at lower temperatures resulted in significantly higher levels of bound phosphorus and b) the heat treatment at a slightly higher temperature (149° C.) resulted a level of bound phosphorus double that of the traditionally phosphorylated starch. The data confirm that the fluid bed process produces products with significantly higher levels of bound phosphorus and higher reaction efficiencies than products prepared via traditional processes.

TABLE I

| Sample | Process | Reaction Temperature (° C.) | Reaction Time (min) | Starch Moisture during Reaction (%) | Bound Phosphorus (%) | Reaction Efficiency (%) |
|---|---|---|---|---|---|---|
| Sample A | Continuous Cooker | 146 | 45 | 2–4 | 0.19 | 18 |
| Sample B | Fluid Bed Reactor | 127 | 60 | 0 | 0.25 | 24 |
| Sample C | Fluid Bed Reactor | 138 | 60 | 0 | 0.32 | 30 |
| Sample D | Fluid Bed Reactor | 149 | 60 | 0 | 0.40 | 38 |

Example 3

This example demonstrates the ability of the present process to afford improved non-degraded starch phosphate monoesters compared to the starch phosphate monoesters prepared via conventional processes.

The degradation of the starch phosphate monoesters was indirectly measured by taking the Brookfield viscosity of the product in a highly concentrated potassium hydroxide solution. This method is described in full in U.S. Pat. Nos. 4,176,335 and 4,964,953, and is known to eliminate charge contribution to the viscosity of charged starches, thus enabling an indirect measure of the relative degree of degradation of charged starches.

Waxy corn starch was phosphorylated according to the inventive method of Example 1. The moisture content of the sodium tripolyphosphate impregnated starch was reduced in a fluidized bed reactor to less than 1%. Then, the impregnated starch was heated at 149° C. for 60 minutes to effect phosphorylation.

A second sample was prepared according to the conventional procedure also described in Example 1. A sample of the sodium tripolyphosphate impregnated waxy corn starch having an initial moisture content of about 4% was heated at 143° C. in a continuous cooker for about 45 minutes.

Two grams of each phosphorylated starch was then added to a mixture of 50 ml of water and 50 ml of 5.0 M potassium hydroxide, and the viscosities of the solutions measured with a Brookfield RV Viscometer. The starch phosphate monoester of the present invention, which had been subjected to more rigorous reaction conditions, unexpectedly exhibited a relatively high viscosity of 700 centipoise ("cps"). This was an improvement of over 40% compared to the viscosity of the traditionally prepared starch phosphate monoester which was only 418 cps.

Since the conditions under which the viscosities were measured eliminated the effective charge contribution to viscosity, the increased viscosity of the products of the present inventive process suggested that the improved starch phosphate monoester product prepared via the present inventive process was less degraded than the product produced via the conventional process.

Example 4

This example illustrates that the addition of oligosaccharides to the present inventive process increases the viscosity of the starch phosphate monoester products as compared to the products prepared without the addition of oligosaccharides.

Two starch phosphate monoesters, one prepared with and one without the addition of oligosaccharides, were prepared as follows. For Sample A, sodium tripolyphosphate (150 g, 5% calculated on dry starch) was dissolved in deionized water (4500 g) while maintaining a pH of 6 with hydrochloric acid or sodium hydroxide. Then, C-Dry® GL 01928 (300 g, 10% oligosaccharides calculated on dry starch) was dissolved in the aqueous sodium tripolyphosphate solution and waxy corn starch (3000 g) was added to form a slurry. The pH of the starch slurry adjusted to 6, stirred for 30 minutes and filtered with a Buchner funnel. The starch was air dried and ground using a Prater Mill.

Sample B was prepared without the addition of oligosaccharides as follows. Sodium tripolyphosphate (150 g, 5% calculated on dry starch) was dissolved in deionized water (4500 g) while maintaining a pH of 6. Then, waxy corn starch (3000 g) was added to the aqueous sodium tripolyphosphate solution, and the pH of the slurry adjusted to 6. The slurry was stirred for 30 minutes and filtered on a Buchner funnel. The starch was air dried and ground using a Prater Mill.

Samples A and B were phosphorylated in a fluid bed reactor under the following conditions. The reactor was pre-heated to a temperature of 104° C. The starch (about 3 kg) was loaded into the reactor and the starch temperature was increased to 104° C. The starch temperature was held at 104° C. until the moisture content was less than 1%. Afterwards, the temperature was increased to 149° C. and maintained for 30 minutes.

The viscosity profiles of the starch phosphate monoesters (Samples A and B) were measured with a Brabender Visco-Amylograph on samples prepared according to the following procedure: 5.4% starch solids in 500 g of starch slurry having a pH of 5 to 5.5. The slurry was then heated at a rate of 1.5° C./minute from a temperature beginning at 40° C. and increasing to 95° C. When 95° C. was reached, the temperature was held for 20 minutes.

Both samples were found to have a very similar levels of bound phosphorus: Sample A: 0.40% and Sample B: 0.41%. The Brabender viscograms for the samples A and B as well as the temperature profiles are presented in FIG. 2. The Brabender viscograms show that starch which was phosphorylated in the presence of oligosaccharides (Sample A) shows a maximum viscosity of over 2000 BU. By contrast, the sample which was phosphorylated without the addition of oligosaccharides (Sample B) exhibits a maximum viscosity of only about 1250 BU.

Example 5

This example illustrates the improvement in the color of starch phosphate monoesters prepared via the virtually anhydrous fluid bed processing method of the present invention compared to the products prepared according to traditional phosphorylation methods.

Samples A and B were prepared using corn as the base starch. Sample A was phosphorylated with tripolyphosphate according to the process of the present invention by heating the dried, impregnated starch in a fluid bed reactor for 30 min at a reaction temperature of 149° C. This resulted in a level of bound phosphorus of 0.32 %. Sample B was phosphorylated according to the traditional method. Impregnation of the starch was carried out according to the method described in U.S. Pat. No. 4,166,173 by drying the impregnated starch in an oven at about 50° C. to a moisture of about 4%. Subsequent heat treatment was performed in an oven for 45 min at 149° C.

The color of the starch phosphate monoester products were then compared using L-values determined with a Hunterlab ColorQuest II instrument, An L-value of 0 represents the color black, and an L-value of 100 is correlated to white. The color values revealed that sample A (L-value of 93.4) was significantly less colored than sample B (L-value of 80.4).

Example 6

This example illustrates the improvement of gel hardness and water retention in Surimi systems prepared with starch phosphate monesters compared to surimi products prepared with the corresponding native starches currently used in the industry.

Samples of starch phosphates were prepared from waxy corn and tapioca starch. The samples were prepared by dissolving sodium tripolyphosphate (200 g, for waxy corn sample, 240 g for tapioca sample) in water (6000 g) and adding the starch (4000 g, anhydrous weight) to the solution. The starch slurry was stirred for 30 minutes and filtered on a Buchner funnel. The impregnated starch was then air dried to a moisture content of about 10% and ground using a Prater mill.

The two impregnated starches (waxy corn and tapioca starches) were phosphorylated in a fluid bed reactor under the following conditions. The fluid bed reactor was preheated to 115° C., the starch (about 4 kg) was loaded into the reactor, the temperature was increased to 115° C. The starch was dried until its moisture was less than 1%, then the temperature was increased to a reaction temperature of 149° C. and maintained for 30 minutes. The resultant waxy corn starch phosphate monoester had a level of bound phosphorus of 0.38%. The tapioca starch phosphate had a level of bound phosphorus of 0.34%.

The starch phosphates were evaluated in a surimi model system and compared to native waxy corn and tapioca starch. The surimi samples had the following composition:
Surimi (pollock):57%
Water/Ice: 35%
Salt: 2%
L/8Starch: 6%

The surimi was made from Alaska pollock medium grade and contained regular cryoprotectants (4% sugar, 5% sorbitol, and 0.3% sodium polyphosphate). The surimi samples were analyzed for gel hardness (texture measurement of shear stress) and water retention after 10 freeze-thaw cycles. The data listed in Table II, below, illustrates that, compared to native starches, the use of starch phosphates in a surimi model system significantly improves gel hardness and water retention.

TABLE II

| Sample | Gel Hardness (Shear Stress) [kPa] | Water Retention (after 10 freeze-thaw cycles) [%] |
| --- | --- | --- |
| Tapioca Starch | 32.1 | 66.7 |
| Tapioca Starch Phosphate | 34.4 | 75.5 |
| Waxy Corn Starch | 30.6 | 59.4 |
| Waxy Corn Starch Phosphate | 36.4 | 76.8 |

Example 7

This example illustrates the improvement in shred, melt matting and hardness in cheese prepared from the starch phosphate monoesters of the present invention compared cheese prepared from industry standard starches.

The shred, melt, matting and hardness of imitation cheese prepared from starches commonly used in the industry was compared to an imitation cheese prepared from the starch phosphate monoesters of the present invention. In particular, a waxy, debranched octenyl succinate anhydride modified starch (Sample A) and an acid converted corn starch (Sample B) was compared to a starch phosphate monoester prepared according to the present invention having a bound level of phosphorous of 0.36% (Sample C).

The imitation cheese samples were prepared from the following ingredients in the specified weight ratios.

| | |
| --- | --- |
| Water | 47.60% |
| Code 321 Fat[1] | 24.30% |
| Rennet Casein[2] | 18.30% |
| Starch | 6.00% |
| Sodium Citrate | 2.50% |
| Lactic Acid (88%) | 0.80% |
| Disodium Phosphate | 0.25% |
| Trisodium Phosphate | 0.25% |

[1]Loders Croklaan USA
[2]New Zealand Milk Products

Water, disodium phosphate, trisodium phosphate, and sodium citrate were combined in a Groen steam jacketed kettle, heated to 38° C., and agitated to solubilize the salts. Rennet casein was then added to the solution and mixed for five minutes. Code 321 Fat was then melted (at less than 38° C.) and slowly added to the solution. The temperature of the kettle was increased slowly up to 85° C., then maintained for five minutes. The resultant product was removed from the kettle, placed in molds and refrigerated.

The imitation cheese product was evaluated for shred, melt and hardness (gel characteristics). Shred quality was evaluated on the basis of the resiliency of the shred (hardness), and matting (how well the shred keeps definition when pressure is applied). Melt was evaluated by melting 100 grams of the shredded cheese in an oven at 350° F. for 3 minutes to determine the uniformity of the melt, elasticity of the melt, and whether or not the oil/fat separates from the cheese mass.

The hardness of the cheese was measured on a Texture Technologies TAX-T2 Texture Analyzer on a 1×3.5×3.5 cm³ cube of the imitation cheese. Compression was measured on sliced samples with a Texture Technologies TA.XT2 Texture Analyzer by (i) compressing the sample to a percentage of its product high, (ii) allowing the sample to rest for a fixed time period, and (iii) repeating the original compression to precisely the same distance as the original penetration. Samples were tempered at room temperature for half a day before compression. The compression parameters were set as follows: 1 inch plastic cylinder probe, a pre-speed of 5 mm/s, a compression speed of 1.7 mm/s, a post-speed of 5 mm/sec, a distance of 5 mm, a time of 10 sec, and a trigger of 5 g.

The data, presented in Table III, show that the cheese treated with the starch phosphate monoesters of the present invention resulted in a firmer product, improved shred and resiliency while desirably maintaining standard melt as compared the products treated with starches standard in the industry.

TABLE III

| Starch | Shred | Melt | Matting | Hardness (kPa) |
|---|---|---|---|---|
| Sample A | Good | Good | Good | 6551 |
| Sample B | Average some fraying around edge | Average slight oiling out | Average shreds were sticking together | 6475 |
| Sample C | Excellent smooth | Average Slight oiling out | Excellent | 10963 |

Example 8

This example illustrates that yield, purge and textures demonstrated by meat samples prepared with the improved starch phosphate monoesters of the present invention are superior to meat treated with native and certain modified starches commonly used in the industry.

Meat samples were prepared from turkey and the starch phosphate monoesters prepared according to the fluidized bed processing of Example 1 and native potato starch, an industry standard starch. The final samples had the following composition: starch (3.0%), phosphate (0.4%), salt (0.4%) and dextrose (1.95%).

The samples were prepared according to the following procedure. Starch (11.70%), phosphate (1.56%), salt (1.56%) and dextrose (1.95%) were dispersed in water and mixed. The mixture was then transferred to an injection tank (Townsend Injection System®) and injected into whole turkey pieces. The turkey pieces were ground through a kidney plate (Biro Grinder®) and tumbled under vacuum for one hour. The resultant product was packed into T-PAK Faserin 6G casing, then steam cooked at 77° C., sliced and vacuum packed.

The injected meat products were then evaluated for yield, purge and texture. The injected turkey samples were weighted before and after cooking to determine weight loss. The turkey product sample of the present invention demonstrated a yield of 91.72%, comparable to the 86.11% yield of the industry standard potato starch.

The vacuum packed turkey samples were weighed, then opened and weighed again after the samples had dried after 15, 45, and 75 days of storage. As is illustrated in Table IV, below, products prepared according to the present invention ("Waxy Corn Phosphate") had superior purge (less moisture loss) compared to samples prepared from potato starch, an industry standard.

TABLE IV

| | Purge | | |
|---|---|---|---|
| Sample | 15 days (%) | 45 days (%) | 75 days (%) |
| Potato Starch | 3.411 | 3.495 | 3.458 |
| Waxy Corn Phosphate | 0.951 | 1.785 | 1.493 |

Texture was evaluated by measuring the hardness, and cohesiveness of the meat samples. Compression and cut testing were measured on sliced samples with a Texture Technologies TA.XT2 Texture Analyzer by (i) compressing the sample to a percentage of its product high, (ii) allowing the sample to rest for a fixed time period, and (iii) repeating the original compression to precisely the same distance as the original penetration. The test conditions were as follows: the pre-test speed was 2.0 mm/sec.; test and post-test speeds were 5.0 mm/sec; samples were compressed to 35% of their height; time between strokes was 0.5 sec.; the auto trigger was set at 5.0 g; and data was collected on a TA-30 3 inch diameter acrylic plate.

The texture data for hardness and cohesiveness are presented below in Table V. The use of the phosphorylated starch prepared according to the present invention resulted in a meat product having desirably less hardness and cohesiveness compared to that of the meat product prepared from potato starch which is commonly used in the industry. "SD" in the graph below represents the standard deviation of each mean or average value presented for hardness and cohesiveness.

TABLE V

| | Hardness | | Cohesiveness | |
|---|---|---|---|---|
| Sample | Mean | SD | Mean | SD |
| Waxy Corn Phosphate | 11820 | 2153 | 0.599 | 0.03 |
| Potato | 15663 | 1444 | 0.65 | 0.03 |

We claim:

1. A process of mono-phosphorylating a starch comprising:
   (a) impregnating the starch with a phosphate reagent to form an impregnated starch;
   (b) drying the impregnated starch to less than 1% moisture by weight; and
   (c) heating to phosphorylate the starch.

2. A process according to claim 1 wherein the impregnated starch is dried to a virtually anhydrous state.

3. A process according to claim 1, where the impregnated starch is dried while in a fluidized state at a temperature of less than about 140° C.

4. A process according to claim 3, wherein the temperature is between about 100° C. to about 125° C.

5. A process according to claim 1, wherein step (c) is carried out at temperatures of between about 100° C. to about 185° C. for about 30 to about 300 minutes.

6. A process according to claim 5, wherein step (c) is carried out at temperatures of between about 120° C. to about 140° C.

7. A process according to claim 1 wherein the amount of phosphate reagent is less than 15% by weight on dry starch.

8. A process according to claim 1 wherein step (a) comprises dissolving the phosphate reagent in water to form a solution, adding the starch to the solution to form a slurry of the impregnated starch, and filtering the impregnated starch out of the slurry.

9. A process according to claim 1 wherein step (b) and (c) are done simultaneously.

10. A process according to claim 1 wherein step (a) further comprises impregnating the starch with at least one oligosaccharide.

11. A process according to claim 10 wherein step (a) comprises: dissolving the phosphate reagent and oligosaccharide in water to form a solution; adjusting the pH of the solution to about 6; adding the starch to the solution to form a slurry of the impregnated starch; and filtering the impregnated starch out of the slurry.

12. A process according to claim 9, wherein step (a) further comprises adding an oligosaccharide to the impregnated starch.

13. A starch phosphate monoester made according to the process of claim 1.

14. A process of using the starch phosphate monoester of claim 13 comprising the steps of:

(a) incorporating the starch phosphate monoester into food; and (b) processing the food to obtain a food product suitable for commercial use.

15. A food composition prepared according to the process of claim 14.

16. A food composition comprising the starch phosphate monoester of claim 13 and a food ingredient.

17. The food composition of claim 15 wherein the food ingredient contains protein.

18. The food composition of claim 15 wherein the food ingredient has an intermediate to low moisture content.

19. The food composition of claim 17 wherein the food ingredient is selected from the group consisting of meat, fish and cheese.

* * * * *